United States Patent Office 3,644,291
Patented Feb. 22, 1972

3,644,291
TITANIUM COMPOUNDS AS POLYCONDENSATION CATALYSTS IN PREPARATION OF LINEAR POLYESTERS
John A. Price, Swarthmore, and Mary J. Stewart, Riddlewood, Pa., assignors to FMC Corporation, Philadelphia, Pa.
No Drawing. Filed Nov. 20, 1968, Ser. No. 777,460
Int. Cl. C08g 17/015
U.S. Cl. 260—75 R        10 Claims Process for preparing linear polyesters comprising carrying out an ester-interchange reaction between a diol and a lower dialkyl ester of a saturated aromatic dicarboxylic acid or carrying out a direct esterification reaction between a diol and a saturated aromatic dicarboxylic acid and then polycondensing the reaction product thereof in the presence of a polycondensation catalyst selected from the group consisting of titanium (III) oxalate, titanium oxyacetylacetonate, titanium disulfide, titanium phosphide, titanium (II) acetylacetonate, sodium titanium silicate, titanium tri-acetylacetonate, and titanium ammonium citrate.

---

This invention relates to an improved method for the preparation of linear polyesters. More particularly, it relates to an improved polycondensation catalyst for use in the manufacture of highly polymeric linear polyesters.

It is known that linear polyesters can be prepared from a suitable ester of a dicarboxylic acid or a dicarboxylic acid by initially reacting such a material with a diol. When an ester of a dicarboxylic acid is used as a starting material, it is first reacted with a diol in the presence of a transesterification catalyst by means of an ester-interchange reaction; whereas, when a dicarboxylic acid is used as a starting material, it is first subjected to a direct esterification reaction with a diol in the presence of what is generally called a first stage catalytic additive or ether inhibitor. In either instance, the resulting reaction product which may be, in general, described as a polyester prepolymer, is then polycondensed in the presence of a polycondensation catalyst to form a polyester resin.

In the case of the transesterification method of preparing polyethylene terephthalate wherein ethylene glycol is reacted with dimethyl terephthalate, the first stage product of the transesterification reaction is generally described as being comprised mainly of bis(2-hydroxyethyl) terephthalate. Whereas, the first stage reaction product of the direct esterification reaction between ethylene glycol and terephthalic acid is comprised of bis(2-hydroxyethyl) terephthalate along with substantial quantities of higher condensates of ethylene glycol and terephthalic acid. In particular, the product of the direct esterification reaction between ethylene glycol and terephthalic acid and the product of the transesterification reaction between dimethyl terephthalate and ethylene glycol can be described as bis(2-hydroxyethyl) terephthalate or a polycondensation product thereof, wherein the D.P. (dgree of polymerization) varies from about 2 to about 6. However, for purposes of simplicity in describing the present invention, hereinafter the terms "polyester prepolymer" and "bis(2-hydroxyethyl) terephthalate" will both denote and include within their scope the product of the direct esterification reaction between terephthalic acid and ethylene glycol and the product of the transesterification reaction between dimethyl terephthalate and ethylene glycol as set forth above.

Heretofore, various materials have been suggested as polycondensation catalysts for polycondensing the polyester prepolymer products of both the transesterification method and direct esterification method of preparing polyester resins. However, in general, none of the substances that have been suggested as polycondensation catalysts heretofore have been completely satisfactory. For example, many of the polycondensation catalysts of the prior art only catalyze the condensation reaction to a low degree and they do not promote the reaction rate sufficiently to be acceptable for commercial purposes. Obviously a short polycondensation time is desired. Therefore, such polycondensation catalysts of the prior art do not act to form polyester products having carboxyl contents as low as required for some resin uses, or molecular weights and melting points as high as desired.

From a commercial standpoint, it is essential that a polyester resin be produced in the shortest possible time and the desired degree of polymerization be obtained. A polyethylene terephthalate resin suitable for melt spinning should have a carboxyl content value of below about 50 equivalents per million grams (eq./$10^6$ gr. or meq./kg.), a birefringent melting point of at least about 258–260° C., and an intrinsic viscosity preferably not less than about 0.60 (determined in a 60% phenol and 40% tetrachloroethane solution, wt./wt., at 30° C.), in order for the filaments formed therefrom to possess a satisfactory level of hydrolytic stability, thermal stability, ultra-violet light stability and a high degree of tenacity which is necessary for the use of such filaments in the manufacture of fibers such as is used in wash and wear clothing. It is desirable to manufacture polyester resins which have carboxyl contents as close to zero as possible, because there is a generally recognized direct relationship between the carboxyl content of the polyester resin and the hydrolytic, thermal, and ultra-violet light stability of the filaments and films produced therefrom. In general, the higher the carboxyl content of the polyester resin, the less hydrolytic, thermal, and ultra-violet light stability is possessed by the resulting films or filaments.

It is an object of the present invention to prepare highly polymeric linear polyesters by a direct esterification reaction betwen a dicarboxylic acid and a diol or by an ester-interchange reaction between an ester of a dicarboxylic acid and a diol, so as to form a polyester prepolymer and then the polycondensation of the said polyester prepolymer in the presence of an improved polycondensation catalyst.

It is another object of the present invention to prepare a highly polymeric linear polyester resin by polycondensing bis(2-hydroxyethyl) terephthalate in the presence of an improved polycondensation catalyst.

These and other objects are accomplished in accordance with the present invention which involves a method for preparing highly polymeric linear polyesters wherein a lower dialkyl ester of a saturated aromatic dicarboxylic acid is reacted with a diol in the presence of an ester-interchange catalyst to form a polyester prepolymer or where a saturated aromatic dicarboxylic acid is reacted with a diol in the presence of a first stage additive to form a polyester prepolymer and where the resulting polyester prepolymer is polycondensed in the presence of a polycondensation catalyst, the improvement comprising carrying out the polycondensation of the polyester prepolymer in the presence of a catalytic amount of a polycondensation catalyst selected from the group consisting of titanium (III) oxalate, titanium oxyacetylacetonate, titanium disulfide, titanium phosphide, titanium (II) acetylacetonate, sodium titanium silicate, titanium tri-acetylacetonate, and titanium ammonium citrate.

The terms "saturated aromatic dicarboxylic acid" and "lower dialkyl ester of a saturated aromatic dicarboxylic acid" are used herein to denote dicarboxylic acids or esters thereof which do not contain any olefinic unsaturation and wherein the alkyl groups contain from 1 to 6 carbon atoms. In accordance with the present invention, any of the well known saturated aromatic dicarboxylic acids or their esters can be used in the present method. For example, among those which can be used are isophthalic acid and terephthalic acid.

The term "diol" is used herein to denote glycols of the series $HO(CH_2)_nOH$ wherein $n$ is 2 to 10.

The preparation of polyesters via the ester-interchange reaction is generally carried out with a molar ratio of glycol, such as ethylene glycol, to a dialkyl terephthalate, such as dimethyl terephthalate, of from about 1:1 to about 15:1, respectively, but preferably from about 1.5:1 to about 2.6:1. The transesterification reaction is generally carried out at atmospheric pressure in an inert atmosphere such as nitrogen, initially at a temperature range of from about 125° C. to about 250° C. but preferably between about 150° C. and 200° C. in the presence of a transesterification catalyst. During the first stage of this reaction, methyl alcohol is evolved and is continuously removed by distillation. After a reaction period of about one to two hours, the temperature of the reaction mixture is raised to from about 200° C. to about 300° C. for approximately one to three hours in order to complete the reaction so as to form the desired polyester prepolymer and distill off any excess glycol.

Any known suitable transesterification or ester-interchange catalyst, for example, lithium hydride or zinc acetate, can be used to catalyze the present transesterification reaction. Generally, the transesterification catalyst is used in concentrations of from about 0.01% to about 0.20%, based on the weight of the dialkyl terephthalate used in the initial reaction mixture.

Similarly, the preparation of polyester resins via the direct esterification reaction is generally carried out with a molar ratio of glycol, such as ethylene glycol, to a dicarboxylic acid, such as terephthalic acid, of from about 1:1 to about 15:1, but preferably about 1.5:1 to about 2.6:1. The direct esterification step is generally carried out at temperatures ranging from about 180° C. to about 280° C. in the absence of an oxygen containing atmosphere at atmospheric or elevated pressure for about two to four hours to form the desired polyester prepolymer. For example, the reaction may be carried out in an atmosphere of nitrogen.

Any known suitable first stage direct esterification catalytic additive may be used in the direct esterification step of the present method. For example, calcium acetate or triethylamine may be used. The first stage catalytic additives are generally used in concentrations ranging from $5 \times 10^{-5}$ mole to about $5 \times 10^{-2}$ mole of catalytic additive per mole of terephthalic acid present in the initial terephthalic acid-glycol reaction mixture.

The polycondensation step of the present invention is generally accomplished by adding one of the titanium compounds of the subject method to a polyester prepolymer or bis(2-hydroxyethyl) terephthalate and heating the blend thereof under reduced pressure within the range of from about 0.05 mm. to 20 mm. of mercury while being agitated at a temperature of from about 260° C. to about 325° C. for from two to four hours. If indicated, the present titanium catalysts can also be added to the reactants before or during the direct esterification or ester-interchange reaction.

The polycondensation catalysts of the present invention are generally employed in amounts ranging from about 0.01% to about 0.2%, based on the weight of the polyester prepolymer to be polycondensed. Usually, it has been found that from about 0.02% to about 0.1% of the subject polycondensation catalyst is preferred in most instances. Higher or lower concentrations of the present polycondensation catalysts can also be used in the subject polycondensation reaction. However, when concentrations less than the above are used, their effectiveness is generally reduced, whereas if concentrations greater than this are used, no further improvement in the present method or desired product is generally obtained.

The following examples of several preferred embodiments will further serve to illustrate the present invention. All parts are by weight unless otherwise indicated.

EXAMPLE I

A mixture comprising 600 grams of dimethyl terephthalate, 396 grams of ethylene glycol, and 0.24 gram of lithium hydride was charged into a reaction vessel equipped with a nitrogen inlet, heating means and stirring means. The reaction mixture was agitated and heated at atmospheric pressure to 198° C. under a nitrogen blanket. The reaction mixture was held at about 198° C. for about two hours, during which time by-product methyl alcohol was distilled off. Then the temperature of the reaction mixture was allowed to rise to 230° C. over a period of about one hour to distill off any remaining by-product methyl alcohol and excess ethylene glycol and form the polyester prepolymer comprised mainly of bis(2-hydroxyethyl) terephthalate. The prepolymer product was allowed to cool under an atmosphere of nitrogen.

EXAMPLE II

Eight separate fifty gram portions of the prepolymer product of Example I were mixed with 0.02 gram of a polycondensation catalyst of the present invention as listed in the following Table I, and placed in a reaction vessel. These mixtures were heated at about 280° C. under reduced pressure of from about 0.05 to about 0.1 mm. of mercury while under agitation for the times indicated in the following Table I next to the polycondensation catalyst used to bring about polycondensation of the prepolymer product of Example I and formation of a polyester resin. The intrinsic viscosity, carboxyl content values and melting points of the polyethylene terephthalate resins formed are also included in the following Table I:

TABLE I

| Polycondensation catalyst | Vacuum time (hours) | Intrinsic viscosity | Carboxyl value (meq./kg.) | Melting point (° C.) |
|---|---|---|---|---|
| Titanium (III) oxalate | 1.5 | 1.06 | 17 | 260 |
| Titanium oxyacetylacetonate | 1.5 | 1.06 | 15 | 266 |
| Titanium disulfide | 1.0 | 1.00 | 15 | 267 |
| Titanium phosphide | 1.5 | 0.92 | 12 | 265 |
| Titanium (II) acetylacetonate | 1.0 | 0.84 | 15 | 261 |
| Sodium titanium silicate | 2.0 | 0.60 | 7 | 264 |
| Titanium triacetylacetonate | 1.5 | 0.92 | 13 | 265 |
| Titanium ammonium citrate | 1.5 | 0.77 | 13 | 262 |

EXAMPLE III

A blended mixture comprising 474 grams of terephthalic acid, 288 mls. of ethylene glycol, and 149 mls. of triethylamine was charged into a reaction vessel equipped with a nitrogen inlet, a Dean–Stark separating apparatus, heating means, and stirring means. The reaction mixture was agitated and the temperature was raised to about 197° C. under at nitrogen blanket at atmospheric pressure. At about 190° C. a water-triethylamine azeotropic mixture started to distill off. The azeotropic mixture was continuously separated by means of the Dean-Stark apparatus, and the triethylamine recovered was continuously returned to the reaction vessel. The reaction mixture became almost clear. Then the temperature was allowed to rise to about 230° C. over a one hour period to form a polyester prepolymer. The prepolymer product was allowed to cool under an atmosphere of nitrogen.

EXAMPLE IV

Two separate fifty gram portions of the prepolymer product of Example III were mixed with 0.02 gram of a polycondensation catalyst of the present invention as listed in the following Table II, and placed in a reaction vessel. These mixtures were heated at about 280° C. under reduced pressure of from about 0.05 to about 0.1 mm. of mercury while under agitation for the times indicated in the following Table II next to the polycondensation catalyst used to bring about polycondensation of the prepolymer product of Example III and formation of a polyester resin. The intrinsic viscosity, carboxyl content values and melting points of the polyethylene terephthalate resins formed are also included in the following Table II:

TABLE II

| Polycondensation catalyst | Vacuum time (hours) | Intrinsic viscosity | Carboxyl value (meq./kg.) | Melting point (° C.) |
|---|---|---|---|---|
| Titanium (III) oxalate | 1.5 | 0.78 | 10 | 261 |
| Titanium (II) acetylacetonate | 2.0 | 1.05 | 16 | 261 |

The intrinsic viscosity of the polyester resin products of the above examples were measured in a 60% phenol-40% tetrachloroethane solution (wt./wt.) at 30° C. The other analytical values expressed were obtained by conventional laboratory procedures.

The results in the above examples indicate that the subject titanium compounds in general facilitate the preparation of and enhance the polyester resins produced. Through the use of the present method, polyester resins are obtained in a very short period of time which are characterized by low carboxyl values, high melting points, and high molecular weights as indicated by the intrinsic viscosity values.

We claim:
1. In a process of preparing linear polyester resins wherein a lower dialkyl ester of a saturated aromatic dicarboxylic acid is reacted with a glycol of the series $HO(CH_2)_nOH$ wherein $n$ is 2 to 10 in the presence of an ester-interchange catalyst to form a polyester prepolymer or where a saturated aromatic dicarboxylic acid is reacted with a glycol of the series $HO(CH_2)_nOH$ wherein $n$ is 2 to 10 in the presence of a first stage catalytic additive to form a polyester prepolymer and where the resulting polyester prepolymer is then polycondensed in the presence of a polycondensation catalyst, the improvement comprising carrying out the polycondensation of the said prepolymer in the presence of a catalytic amount of a polycondensation catalyst selected from the group consisting of titanium (III) oxalate, titanium oxyacetylacetonate, titanium disulfide, titanium phosphide, sodium titanium silicate, titanium triacetrylacetonate, and titanium ammonium citrate.

2. The process of claim 1 wherein the polycondensation catalyst is present in a concentration within a range from about 0.01% to about 0.2% based on the weight of the polyester prepolymer.

3. The process of claim 1 wherein the polycondensation catalyst is titanium (III) oxalate.

4. The process of claim 1 wherein the polycondensation catalyst is titanium oxyacetylacetonate.

5. The process of claim 1 wherein the polycondensation catalyst is titanium disulfide.

6. The process of claim 1 wherein the polycondensation catalyst is titanium phosphide.

7. The process of claim 1 wherein the polycondensation catalyst is sodium titanium silicate.

8. The process of claim 1 wherein the polycondensation catalyst is titanium tri-acetylacetonate.

9. The process of claim 1 wherein the polycondensation catalyst is titanium ammonium citrate.

10. The process of claim 1 wherein the prepolymer is comprised of bis(2-hydroxyethyl) terephthalate.

References Cited
UNITED STATES PATENTS

| 3,047,515 | 7/1962 | Piirma | 260—75 |
| 3,245,959 | 4/1966 | Roeser | 260—75 |
| 3,321,444 | 5/1967 | Hoyer et al. | 260—75 |
| 3,326,965 | 6/1967 | Schultheis et al. | 260—75 X |
| 3,056,818 | 10/1962 | Werber | 260—75 |

WILLIAM H. SHORT, Primary Examiner

L. P. QUAST, Assistant Examiner